United States Patent [19]
Medeiros et al.

[11] Patent Number: 5,642,331
[45] Date of Patent: Jun. 24, 1997

[54] CONSTANT RADIUS ACOUSTIC SENSOR MOUNTING SYSTEM

[75] Inventors: Diane Medeiros, Tiverton; John Oeschger, Kingston, both of R.I.; Peter R. Hebda, Fall River, Mass.; David F. Notarianni, Cranston, R.I.

[73] Assignee: The United States of America as represented by the Secretary of the Navy, Washington, D.C.

[21] Appl. No.: 605,232

[22] Filed: Feb. 2, 1996

[51] Int. Cl.$^6$ .................................................. H04R 17/00
[52] U.S. Cl. ........................... 367/131; 367/173; 367/13; 367/142
[58] Field of Search ................................ 367/902, 173, 367/165, 131, 13, 142; 310/337; 73/170.12, 170.13, 170.29

[56] References Cited

U.S. PATENT DOCUMENTS

| | | | |
|---|---|---|---|
| 4,007,436 | 2/1977 | McMahon | 367/173 |
| 4,576,034 | 3/1986 | Ferree et al. | 367/13 |
| 5,412,622 | 5/1995 | Pauer et al. | 367/131 |

*Primary Examiner*—Daniel T. Pihulic
*Attorney, Agent, or Firm*—Michael J. McGowan; William F. Eipert; Prithvi C. Lall

[57] ABSTRACT

The present invention relates to a system for studying, identifying and characterizing thermal gradients in a volume of water. The system includes a frame for supporting one or more measuring devices and a source of heat for generating a thermal plume in the volume of water. The frame includes a first plate to which the measuring devices are mounted by a plurality of mounting blocks spaced about the periphery of a hole in the first plate. The frame further includes a second plate, spaced from the first plate, to which the source of heat is mounted.

12 Claims, 3 Drawing Sheets

CONSTANT RADIUS ACOUSTIC SENSOR MOUNTING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a system for studying, identifying and characterizing the temperature gradients within a volume of water.

2. Description of the Prior Art

Typically, the bandwidth of the spatial variability of a thermal plume generated by a small cylindrical heating element is much greater than the bandwidth of available transducers. Since the scattering associated with the thermally driven buoyant plume is well described by weak scattering theory, the Bragg scattering condition can be applied. This condition allows for a more fully resolved spatial bandwidth of the scattering volume by aligning multiple source/receiver pairs of acoustic transducers in a common scattering direction. To properly study this problem, the source/receiver pairs of transducers must be located at a known distance from the area to be studied and also must be aligned at a specific angle with respect to each other and the overall coordinate system.

In the laboratory, the problem was studied using ultrasonic transducers mounted on search tubes. A Compumotor multi-axis positioning system was used to identify the location of the search tubes, which were then suspended from a track transversing the top of the test tank. A stainless steel J-type support frame, which was secured to the tank by an array of clamps and rods, held a small cylindrical heating element at its base which was used to generate turbulence. The heater was powered by a Variac in order to control the nature of the turbulence.

This arrangement had many drawbacks including long set-up time, high degree of inaccuracy of alignment with the heating element and other transducers and very low degree of repeatability. The maximum number of transducers which could be aligned for an experiment within a reasonable set-up time was four. Another problem specific to the search tubes was the separation of the UHF connector from the body of the ultrasonic transducer due to installation and removal of the transducers to and from the search tubes.

Other arrangements for supporting acoustic transducers and hydrophones in an underwater environment are known in the art. For example, U.S. Pat. No. 4,007,436 to McMahon illustrates a self-deploying instrument assembly which includes a plurality of hydrophones mounted on a flexible sheet. The assembly further includes a series of resilient rods which extend from one side of the sheet from positions spaced around the periphery thereof to a hub. The resilient rods are deflectable laterally inwardly with consequent folding of the sheet to place the assembly in a storable configuration smaller than its normal operative configuration.

U.S. Pat. No. 4,576,034 to Ferree et al. illustrates an apparatus for calibrating an ultrasonic transducer array by moving it along an arcuate calibration test member. The apparatus includes four upright posts interconnected by a rectangular carriage which is slidably movable vertically along the posts. A horizontal pivot shaft is rotatably mounted on the carriage. Fixed to the shaft and depending therefrom are two pendulum arms, interconnected at their lower ends by a pair of cross bars on which is slidably mounted a mounting block. An attachment rod is vertically slidably movable in the mounting block and carries a coupling joint at its lower end for mounting the transducer array. A reversible gearmotor drives the pivot shaft through a chain and sprocket assembly in an oscillating motion. Backlash in the gear train is reduced by a bias weight.

U.S. Pat. No. 5,412,622 to Pauer et al. illustrates an apparatus including a plurality of omnidirectional hydrophone sensors in a particularly configured array comprised of ring members which are carried between a plurality of tensioned cables. The cables are tensioned by an anchor weight at the bottom end of the array and a capsule float at the top end. The configuration facilitates simplified signal processing techniques to achieve sound source discrimination in both azimuth and elevation within an underwater environment.

None of these patented underwater support systems lend themselves to the study, identification and characterization of the temperature gradients within a volume of water.

SUMMARY OF THE INVENTION

Accordingly, it is an object of the present invention to provide an improved system for studying, identifying, and characterizing the temperature gradients within a volume of water.

It is a further object of the present invention to provide a system as above which has a low set-up time, a relatively high degree of accuracy of alignment of system components, and a high degree of repeatability.

It is still a further object of the present invention to provide a system as above which can use a relatively high number of acoustic transducers to study, identify and characterize the temperature gradients within the volume of water under study.

The foregoing objects are attained by the system of the present invention.

In accordance with the present invention, a system for studying, identifying, and characterizing the temperature gradients within a volume of water comprises a frame for supporting at least one acoustic transducer and a source of heat. The frame includes a first plate to which the at least one transducer is mounted and a second plate to which the source of heat is mounted. The plates are spaced apart by a plurality of connecting rods. In a preferred embodiment, the first plate is provided with a plurality of apertures by which a plurality of acoustic transducers may be mounted thereto.

The system further comprises a mounting block for each of the transducers. The mounting block has the form of a cube and includes a bore in which a transducer is housed. The mounting block further has a pair of dowel pins which enable it to be mounted to the first plate in a desired location.

Other details, as well as other objects and advantages, of the present invention are set forth in the following detailed description and the accompanying drawings in which like reference numerals depict like elements.

DETAILED DESCRIPTION OF THE PREFERRED EMBODIMENT(S)

Figure 1:
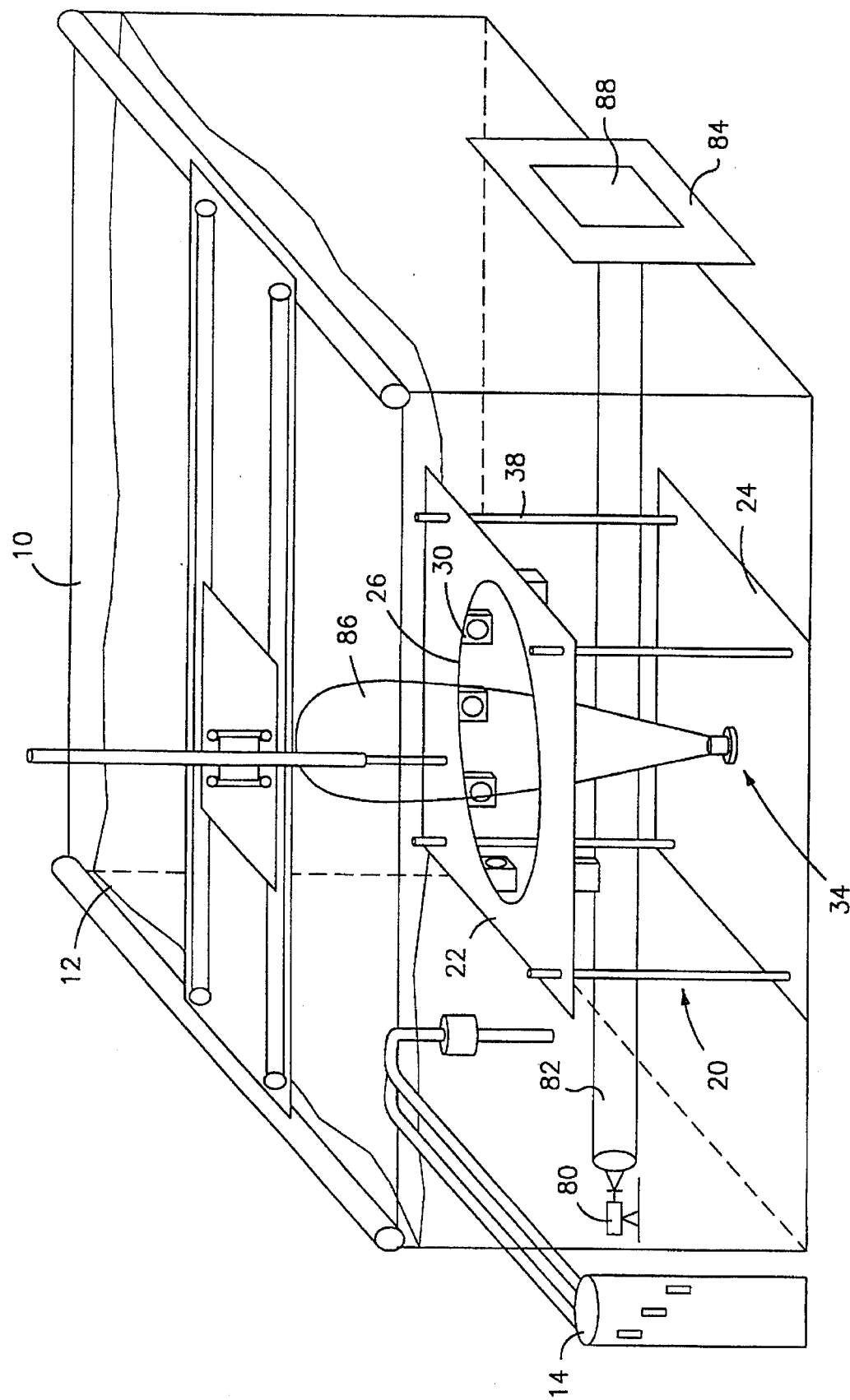
FIG. 1 illustrates the system of the present invention placed within a test cell having a volume of water to be studied.

Referring now to the drawings, FIG. 1 illustrates a test cell 10 containing a volume of water 12 to be studied. The test cell 10 may be formed from any suitable material known in the art such as a clear plastic material. The water may be provided to the test cell in any desired manner. Preferably, a water filtration system 14 is provided to remove impurities from the volume of water under study.

As shown in FIG. 1, the transducer and heating element mounting system is placed within the cell 10 and comprises a frame 20 having two spaced apart plates 22 and 24. Preferably, both plates 22 and 24 are made of anodized aluminum for durability in transport and handing and also for longevity in an underwater environment.

Figure 2:
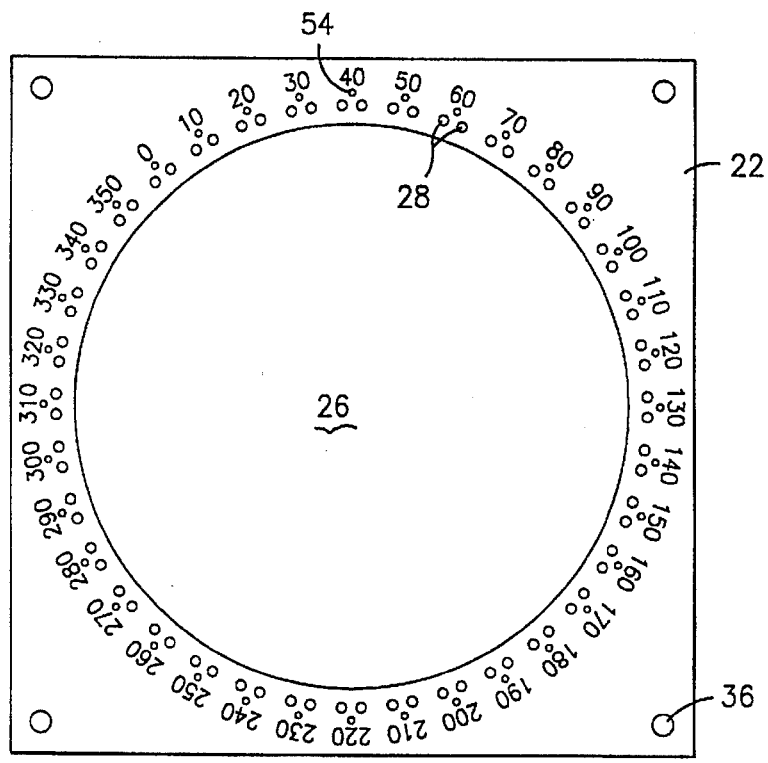
FIG. 2 is a top view of a transducer mounting plate.

The top plate 22, as shown in FIG. 2, is rectangular or square in shape and has a large central hole 26. A plurality of pairs of mounting holes 28 are drilled around the circumference or periphery of the hole 26 to allow placement of a plurality of transducers 30 (FIG. 1) at specific angular increments. The hole 26 may have any desired radius. It has been found that as the hole radius increases, the number of transducers 30 (FIG. 1) that may be accommodated increases. For example, for a 25 cm radius hole, 10 degree increments for mounting the transducers are possible; while a 75 cm radius hole can accommodate 5 degree mounting increments.

Figure 3:
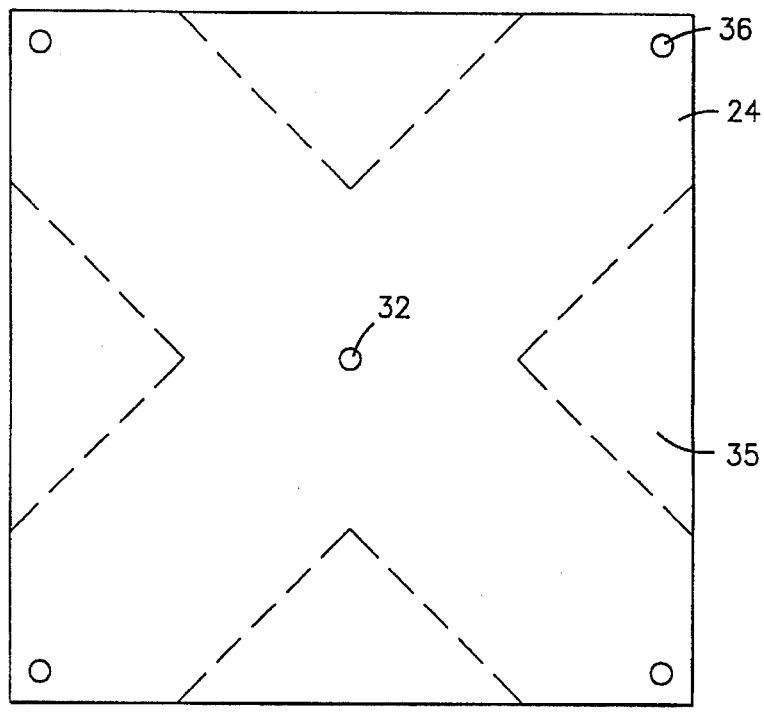
FIG. 3 is a top view of a heater element mounting plate.

As shown in FIG. 3, the lower plate 24 has a shape which corresponds to the shape of the top plate 22. It also has a threaded hole 32 located at its center for mounting a cylindrically shaped heating element 34 (FIG. 1) which is used to create a desired thermal plume in the volume of water and a series of thermal gradients which can be studied, identified, and characterized. The heating element 34 may comprise any suitable heating element known in the art and may be powered in any desired manner. Depending on the size of the plate 24, excess material may be cut out of areas 35 in order to reduce the weight.

Each of the plates 22 and 24 is provided with a plurality of threaded holes 36 at its corners. The holes 36 are provided to accommodate the threaded ends of a plurality of connecting rods 38 (FIG. 1) used to space the plates apart. The connecting rods 38 may have any desired length and may be formed from the same material as the plates 22 and 24. If desired, the connecting rods 38 may be adjustable in length so that the plates 22 and 24 may be adjustably spaced apart and so that the transducers 30 can be focused at various heights in the column of heat generated by the heating element 34.

Figure 4:
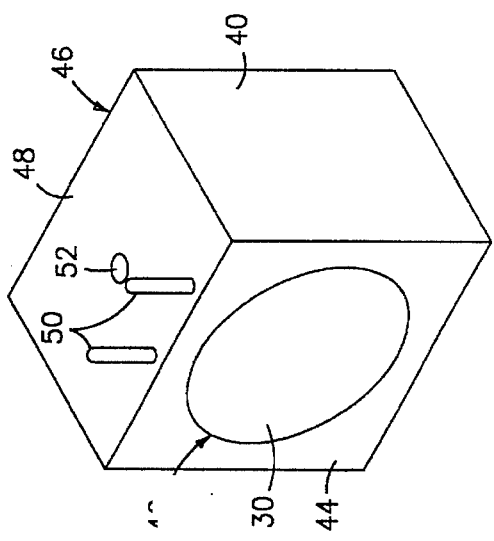
FIG. 4 illustrates a transducer mounting block.

Referring now to FIG. 4, each transducer 30 used to study, identify and characterize the temperature gradients in the water 12 is supported within a block 40 for mounting the transducer to, the top plate 22. The mounting block 40 has the shape of a cube. Preferably, each side of the cube is 5 cm square. A bore 42 extends through the mounting block 40 from the front face 44 of the block to the rear face 46. The bore 42 has one of four different diameters sufficient to accommodate a one-half inch, a three quarter inch, a one inch, or a one and one-half inch transducer. A small set screw (not shown) may be used to lock a transducer 30 in place so that the transducer face fits flush with the front face 44 of the block 40. The mounting block 40 is preferably formed from an anodized aluminum material.

As shown in FIG. 4, the top 48 of the mounting block has two dowel pins 50 and a threaded hole 52 for enabling the block 40 to be mounted to the top plate 22. When the block 40 is mounted to the top plate 22, the dowel pins 50 are inserted through one of the pairs of mounting holes 28 so as to position the transducer in a desired location about the periphery of the hole 26 as shown in FIG. 1. When the mounting block 40 is positioned in a desired location, the threaded hole 52 is aligned with a mating hole 54 in the plate 22. A threaded screw (not shown) may then be inserted into the holes 52 and 54 to secure the mounting block 40 with the transducer 30 in the desired location.

In operation, a plurality of mounting blocks 40, each containing a transducer 30, are placed about the periphery of the hole 26 at desired intervals. The transducers 30 are preferably used in pairs with one of the transducers acting as a sound source and the other acting as a sound receiver. A UHF-type connector (not shown) with a water-tight seal may link each transducer 30 via a shielded BNC cable (not shown) to the supporting data transmission electronics and may connect to the transducer through the rear of the bore 42.

Figure 6:
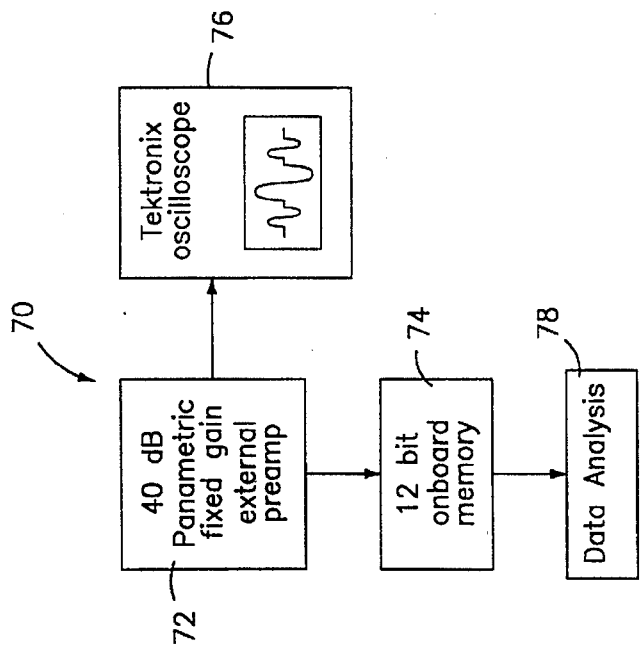
FIG. 6 is a schematic representation of a data acquisition system.
Figure 5:
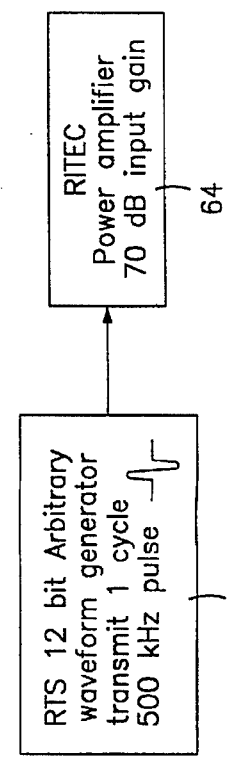
FIG. 5 is a schematic representation of a data transmission system.

As shown in FIG. 5, the data transmission system 60 connected to each transducer 30 may comprise a RTS 12 bit arbitrary waveform generator 62 which transmits a 1 cycle, 500 kHz pulse and a RITEC power amplifier 64 with a 70 dB input gain. The data acquisition system 70, as shown in FIG. 6, may include a 40 dB Panametric fixed gain external preamplifier 72 connected to a 12 bit onboard memory 74, a Tektronix oscilloscope 76, and a computer 78 programmed for data analysis. The electronics which form the data transmission system 60 and the data acquisition system 70 do not form part of the present invention and may comprise any suitable electrical equipment known in the art.

The system of the present invention may be used to take three types of acoustic measurements which are used to calculate the transfer function of the acoustic data. These measurements are:

(1) to calculate the incident pressure field, a direct path measurement is made between each source and receiver with the receiver placed at the center of the scattering volume;

(2) a "plume on" measurement in which the scattered signal from the plume is range gated and digitized; and (3) a "plume off" measurement which is used to subtract from the scattered signal any stationary reverberation.

An illustration of how the system is used to study, identify and characterize the temperature gradients within a volume of water is as follows. The transmit signal may consist of a single-cycle waveform with center frequency of 500 kHz, amplified by a 2 kW power amplifier. Each of the transducers 30 may have a 10 dB down point bandwidth of 500 kHz, i.e. 250 to 750 kHz. At a time t=0, a first transducer 30 acting as a first source transmits the single-cycle signal and a second transducer acting as a first receiver is range gated at the plume and the received signal is digitized at 5 MHz. The waveforms are stored in place onboard the data acquisition system and off loaded after the completion of the experiment. Since the scattering field is, in general, time dependent, it is necessary to measure the scattering for a second source/receiver pair formed by two different transducers 30 as near simultaneous as possible with the first source/receiver pair. Typically, reverberation persists on the order of milliseconds, while the time variability of the plume is on the order of hundreds of milliseconds and longer. A transmit time for the second source at t=5 msec after that of the first source is sufficiently small to ensure that the second source/receiver pair interrogates the same scattering field as the first source/receiver pair. The system repetition interval may be chosen as 15 msec. This cycle may be repeated 1023 times for a total of approximately 15 seconds of plume variability data.

A laser 80 is provided to monitor the turbulent nature of the plume 86 and the scattering field therein. The plume (scattering field) cannot be seen in the water. The laser 80 is used to shine a red laser beam through the plume. The results give an accurate image of the nature of the plume (scattering field) which is then shown on screen 84. The image 88 on the screen accurately reflects the nature of the turbulence in the plume.

Unlike systems previously used, the system of the present invention has a low set-up time, a relatively high degree of accuracy of alignment with the heating element and other transducers, and a high degree of repeatability. Also, the number of transducers which can be used in an experiment is limited only by the number of mounting holes in the ring. Thus, a ring with 10 degree mounting increments can support 36 transducers; while a larger ring with 5 degree mounting increments could support 72 transducers.

Besides locating a transducer within an x-y plane, another advantage can be realized by mounting adapters on the ring which can locate a transducer on the same radius as the ring, but in the orthogonal or z-direction. This would allow for three dimensional acoustic experiments which were not possible before.

The frame of the present invention may be made of alternate materials although some key properties should be maintained. For example, the top plate 22 should be made of a rigid material such that no bending or flexing occurs during deployment or transport. The material which is used must also allow the mounting block to be mounted tightly and securely and should be able to withstand prolonged exposure in an underwater environment.

It is apparent that there has been provided a constant radius acoustic sensor mounting system which fully satisfies the means, objects and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for studying, identifying, and characterizing the temperature gradients within a volume of water, said system comprising:

a frame for supporting at least one sensor and a source of heat; and said frame comprising a first plate to which said at least one sensor is mounted and a second plate to which said source of heat is mounted.

2. The system of claim 1 wherein said frame further comprises a plurality of connecting rods for maintaining said first plate spaced from said second plate.

3. The system of claim 1 wherein said first and second plates are each formed from anodized aluminum.

4. The system of claim 1 further comprising a block for mounting a sensor to said first plate, said block having a bore in which said sensor is housed so that a face of said sensor is substantially flush with a front face of said block.

5. The system of claim 4 wherein said block is formed from anodized aluminum.

6. The system of claim 4 wherein:

said block has two dowel pins extending from an upper surface; and said first plate has at least two holes therein for receiving said dowel pins.

7. The system of claim 6 further comprising:

said block further having a threaded hole in said upper surface;

said first plate having a mating hole; and means for connecting said block to said first plate via said threaded hole and said mating hole.

8. The system of claim 1 further comprising:

said at least one sensor comprising a plurality of acoustic transducers;

said first plate having a hole cut into a central portion thereof; and a plurality of mounting blocks mounted to said first plate, said mounting blocks being spaced about the periphery of said hole, and each of said mounting blocks housing one of said acoustic transducers.

9. The system of claim 8 wherein:

said first plate has a plurality of pairs of apertures spaced about the periphery of said hole;

said mounting blocks each have a pair of dowel pins extending from an outer surface; and each of said mounting blocks being mounted to said first plate by insertion of its pair of dowel pins into one of said pairs of apertures in said first plate.

10. The system of claim 9 wherein:

each mounting block has a threaded hole in said outer surface;

said first plate has a plurality of mating holes; and each mounting block is secured to the first plate by a screw means which passes through one of said mating holes into said threaded hole.

11. The system of claim 1 wherein:

said second plate has a threaded hole located at its center; and said source of heat comprises a heating element threaded into said threaded hole, said heating element generating a thermal plume in said volume of water.

12. The system of claim 1 further comprising:

means for transmitting data from said at least one sensor; and means for acquiring said data transmitted from said at least one sensor.

* * * * *